Patented Aug. 18, 1953

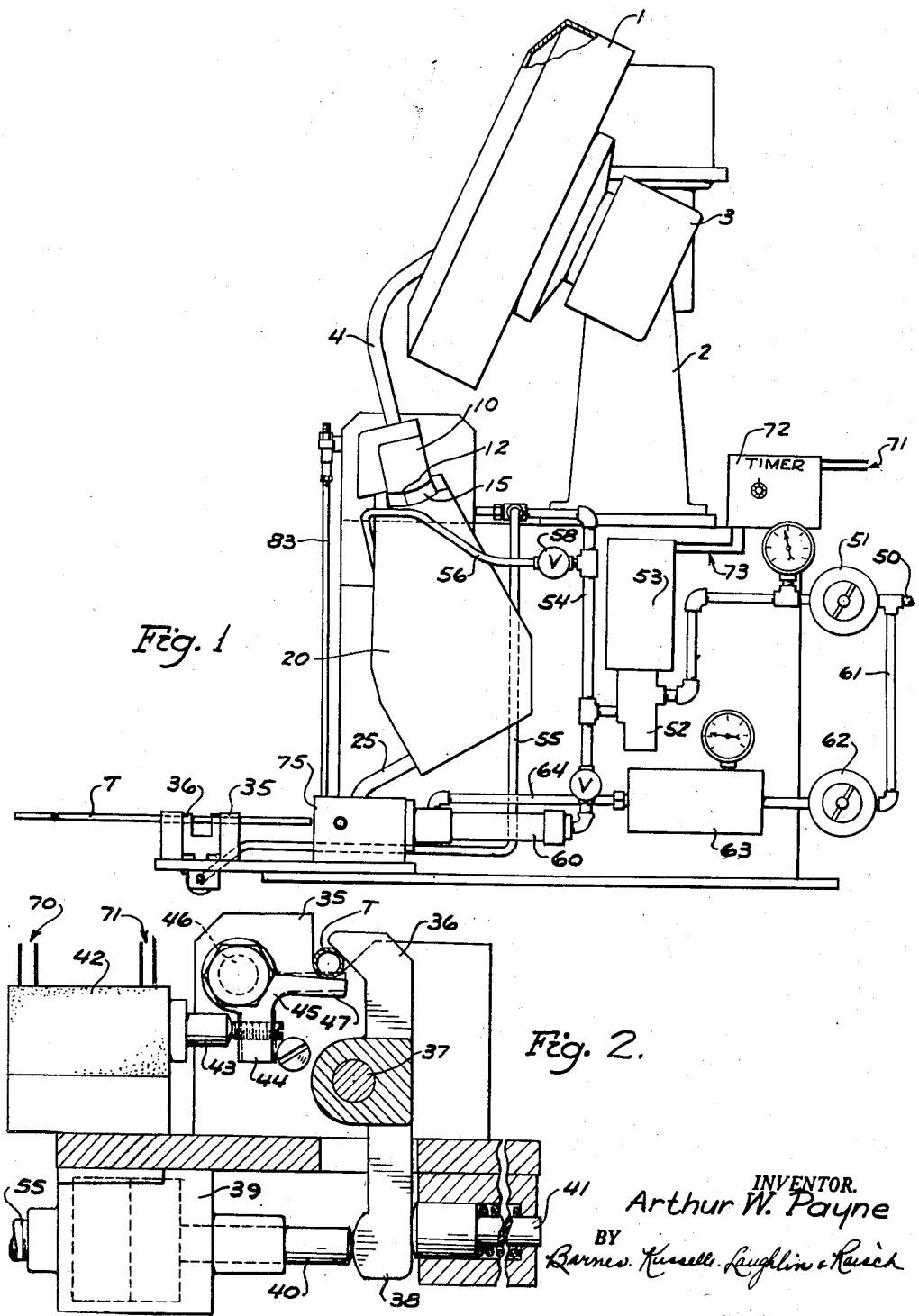

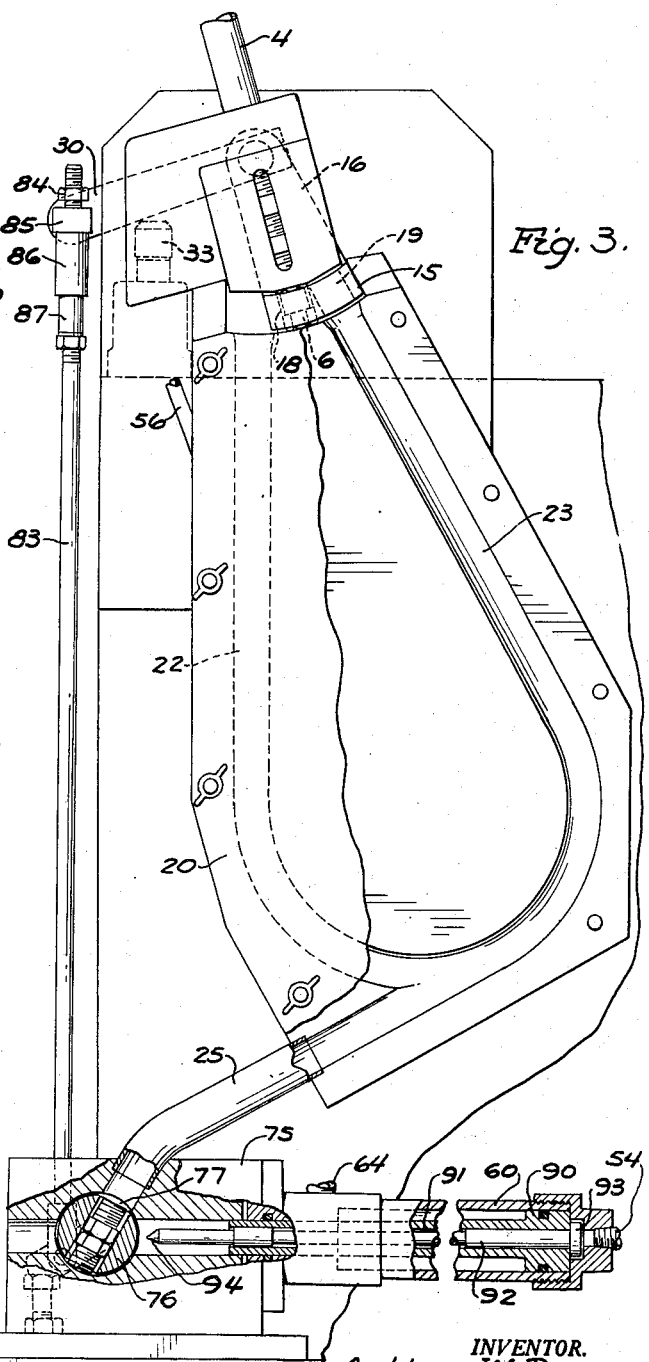

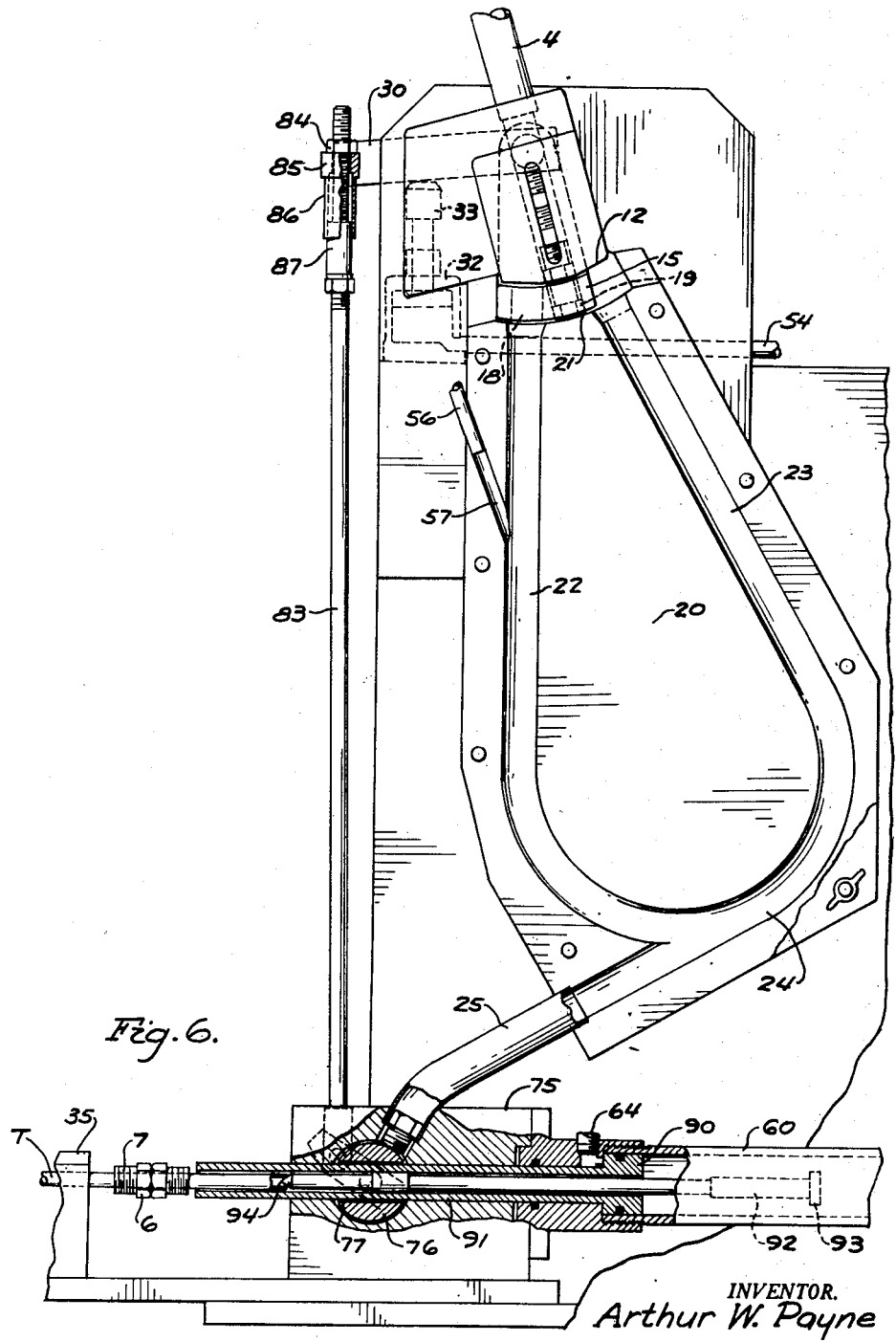

2,649,178

UNITED STATES PATENT OFFICE 2,649,178

MACHINE FOR FEEDING FITTINGS

Arthur W. Payne, Detroit, Mich., assignor to Bundy Tubing Company, Detroit, Mich., a corporation of Michigan Application November 1, 1948, Serial No. 57,802

1 Claim. (Cl. 193—39)

This invention relates to a machine for placing fittings on tubing.

Tubing of relatively small size, and for purposes of conducting liquid fuel, oil, and other liquids, and for conducting gas, and for use as a vacuum line or the like, is usually connected at its ends to a receptacle or to some other element, such as fuel burning equipment, or a pump or the like, or even to another length of tubing, by means of fittings ordinarily screw threaded together. One fitting member of such a coupling usually comprises a body through which the tube passes with the body provided with a screw thread and usually with a polygonal shaped head for the reception of a wrench or the like. The fittings are screwed together and the tubing is held and sometimes clamped in position as the fittings are brought together as distinguished from having screw threads or other formation on the tubing.

Where a length of tubing is to be used in an installation where it is so mounted at both ends, two fittings must be placed on the tube. Heretofore, this has been a hand operation. It will be understood that when tubing is manufactured to precise dimensions, the lengths of tubing are substantially completed and often shipped to the customer with the fittings applied thereto.

It is an object of the present invention to provide an apparatus for applying two fittings to a length of tubing so that the fittings are reversed relative to each other in order that one fitting member may be properly positioned for functioning at one end of the tubing while the other is properly positioned for functioning at the opposite end of the tubing. In this connection, a hopper is used for selecting and feeding the fittings therefrom and a reversing means is provided for reversing the position of alternate fitting members so that when two of such members are applied to the tube, they are in the necessary reversed position. A further object of the invention is to provide an apparatus for applying the fitting members to tubing at a rate faster than was heretofore possible and in an assured manner and with less labor.

Generally, the fittings are sorted and fed from a hopper, alternate fittings are reversed and fed to a holder and when a tube is positioned properly where it is clamped and held, operating means serves to advance two reversely positioned fittings and apply the same to the tubing. One mechanism for carrying out the invention is disclosed in the accompanying drawings:

Fig. 1 is a side elevational view of the apparatus illustrating the hopper, the conduit system for compressed air for operating the machine, and illustrating a length of tubing in position to be acted upon.

Fig. 2 is an enlarged cross sectional view taken substantially on line 2—2 of Fig. 3 showing a length of tubing clamped in position.

Fig. 3 is a side elevational view with some parts broken away and some parts in section showing the fitting reversing arrangement and the applying means.

Fig. 4 is a detailed view looking in the direction of the line 4—4 of Fig. 5 showing the operating mechanism for the fitting holder.

Fig. 5 is a view partly in section taken substantially on line 5—5 of Fig. 3.

Fig. 6 is a view similar to Fig. 3 showing the parts in a different position and illustrating the action of the fitting applying means.

Figure 7:
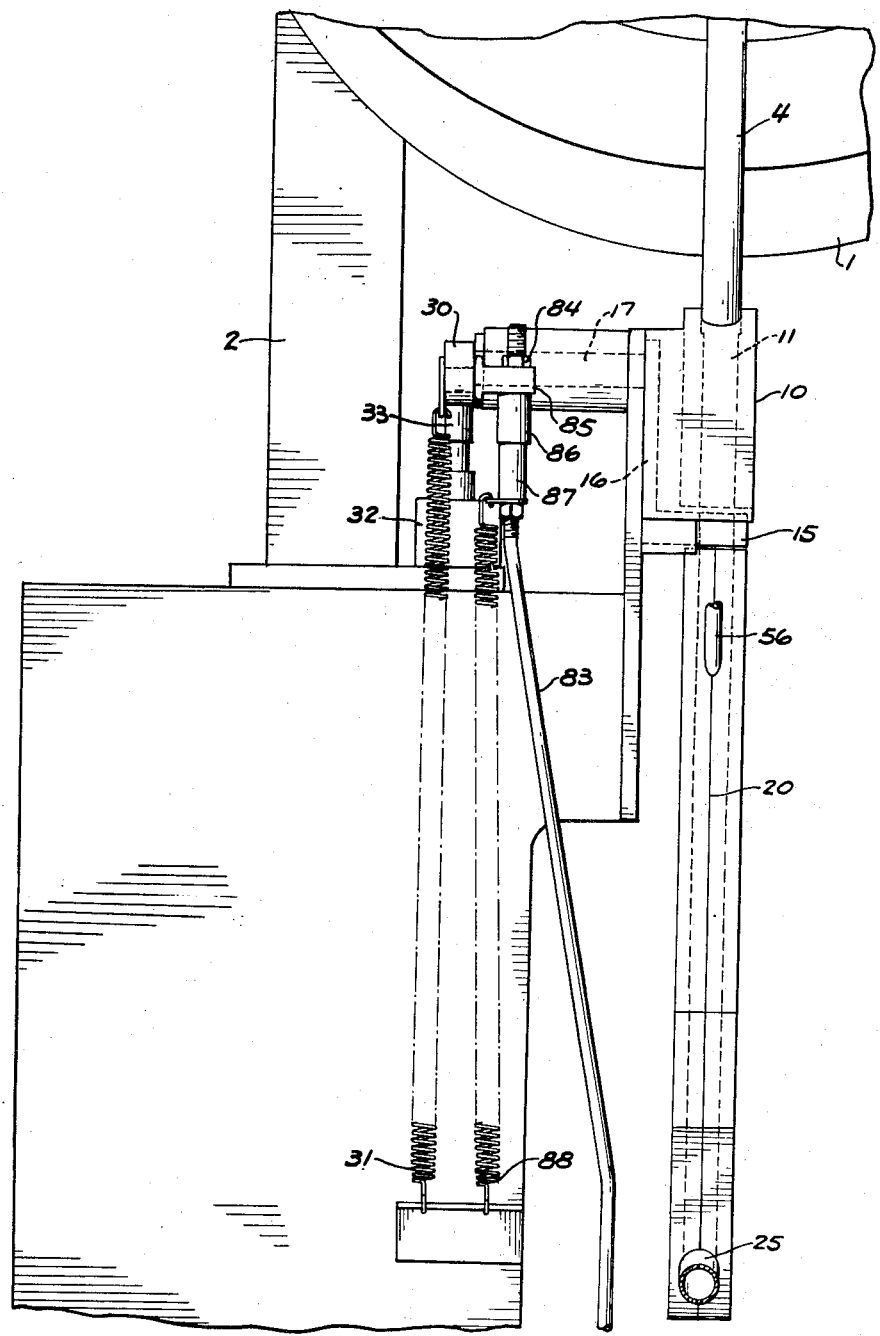
Fig. 7 is a view illustrating some of the operating mechanism.

As illustrated in Fig. 1, there is a hopper 1 supported by a post 2 and which is revolved by suitable means, such as a motor 3. This hopper may be of any one of a type into which a quantity of fittings are placed and which, in its operation, selects and feeds the fittings into an outlet conduit 4 with the fittings all disposed in one position. The fittings may be as illustrated in Fig. 6 with each comprising a body with a bore therethrough for receiving tubing and each having a nut-shaped head 6 and a screw threaded portion 7. The tubing, as shown in Fig. 6, is illustrated at T. As shown in Fig. 3, the fittings are fed with the heads thereof positioned downwardly.

There is an oscillating device or shuttle to which the fittings are fed by the conduit 4. The conduit 4 connects into a fixed body 10 with a passageway 11 therein into which the nuts are fed and the lower end is arcuate in formation as shown at 12, and positioned below the arcuate surface 12 is a shuttle member 15. The shuttle member 15 has an arm 16 pivotally mounted as at 17 and which is operative to shift the shuttle 15 to and from the two positions shown in Figs. 3 and 6. The shuttle member 15 has two apertures or passages therein as at 18 and 19 for receiving fittings.

Positioned below the shuttle 15 is a member 20 having a curved surface 21 which generally corresponds to the arc of movement of the shuttle 15 and it has a tubular passage 22 and a tubular passage 23. These passages meet in a bight portion 24 and leading from the bight portion 24 is a tube 25.

This arrangement provides for the reversing end for end of alternate fittings as follows: In a position which might be considered the at rest position, a fitting falls or slides into the aperture 18 in the shuttle (Fig. 3). When the shuttle shifts to the position shown in Fig. 6 the fitting in aperture 18 falls by gravity through the tube 22 and at the same time another fitting moves into the aperture 19 in the shuttle. Then when the shuttle moves back from the Fig. 6 position to the Fig. 3 position, the fitting in aperture 19 falls through the tube 23 and another fitting moves into the aperture 18. So, it will be seen, that if the shuttle is thus oscillated, fittings are alternately discharged into the tubes 22 and 23.

The fitting which falls into tube 23 moves downwardly, passes through a part of the bight portion 24 and passes out through the tube 25. This fitting therefore maintains its position with the nut-shaped head downwardly or forwardly. On the other hand, the fitting which falls into tube 22 slides into the bight portion 24 with counter-clockwise movement, as Figs. 3 and 6 are viewed; its inertia causes it to slide upwardly in the light portion beyond the intersection of the outlet tube 25; its upward movement is stopped by gravity and it reverses its movement and slides out through the tube 25. In this action the fitting has been reversed end for end. We have referred to the fittings as falling or sliding down and the apparatus thus described is preferably arranged so that the fittings do fall downwardly or slide downwardly by the action of gravity.

The shuttle is actuated by means of an arm 30, secured to the journalled portion 17 thereof and the arm is held normally downwardly in the position shown in Fig. 3 by means of a coil spring 31. An air cylinder 32 with the piston therein is provided with a plunger 33 for engaging the arm 30 and moving it upwardly to the position shown in Fig. 6 when air is supplied to the cylinder, as will presently appear.

There is a suitable bracket arrangement 35 in which the tubing is to be placed. As shown in Fig. 2, the bracket 35 embodies a clamping element 36 pivotally mounted as at 37, and having a depending arm 38. An air cylinder 39 with a piston therein has a plunger 40 for engaging the arm 38 and when the plunger is advanced as shown in Fig. 2, the clamping element 36 grips the tubing T and holds it in position. The clamping element preferably operates against a spring pressed plunger 41 which serves to shift the clamp back to open position when air under pressure is relieved from the cylinder 39. A controlling electric switch 42 has an actuating piece 43 and this is engageable by the arm 44 of a trigger 45 pivotally mounted on the bracket 35 as at 46 and which has an arm 47 for engagement with the tubing. The trigger is very easily operated and when a tubing is positioned in the bracket structure, a slight pressure causes the trigger to oscillate from the dotted line position shown in Fig. 2 to the full line position thus actuating the switch 42 and setting the various elements of the machine into operation.

As illustrated in Fig. 1, air under pressure may be supplied through a conduit 50 which may have a suitable reducer valve 51 therein and this line 50 extends to a general control valve 52 which is operated by a solenoid or electro-magnet 53. Extending from the valve 52 is a conduit 54 which leads to the cylinder 32 as shown in Fig. 6. Connected to the conduit 54 is another conduit 55 which leads to the cylinder 39 as shown in Figs. 1 and 2. An auxiliary conduit 56 leads into the tube 22 so that air may be discharged in a downward direction therein through passage 57 formed in the member 20 and the line 56 may be controlled by a valve 58. The line 54 also extends to a cylinder 60 which, as will presently be seen, performs in the function of applying the fittings to a tube. The air under pressure is supplied through conduit 61 and through a pressure reducing valve 62 to a tank or reservoir 63 from which leads a conduit 64 and which connects into the opposite end of the cylinder 60. The line 61 is connected into the air supply pipe 50 in advance of the control valve 52 and the reducer valve 62 so reduces the pressure that a relatively low pressure is supplied through the conduit 64.

The control switch 42 has electrical current supplied thereto through suitable conductors 70 and leading from the control switch are conductors 71 which extend to suitable electrical timer 72 which is, in turn, connected to the solenoid 53 by conductors 73.

There is a block 75 (Figs. 3 and 6) provided with a fitting holder in the form of a cylindrical oscillating member therein, as shown at 76, and the pipe 25 connects into the block as shown for passing of the fittings to the oscillating cylinder. This cylinder has a passage 77 therethrough and the diameter of the cylinder is such as to receive and hold two fittings, as indicated in Fig. 3. The oscillating cylinder has an arm 80 secured to its axis outside the block 75 (Fig. 4) and this arm may be oscillated to and from positions as determined by stops 81 and 82. A rod 83 is connected to this arm. This rod extends upwardly and is connected to the arm 30. Preferably the connection is one which may slip in one direction, for which purpose the rod 83 is provided with a nut 84 which engages a projection 85 carried by the arm. This projection has a depending sleeve 86 while secured to the rod is a sort of bearing element 87 which is slidable in the sleeve. It will be seen by this arrangement that upward movement of the arm 30 will pull the rod 83 upwardly. In the downward movement of the arm 30, the projection 85 may shift away from the nut 84. A spring 88 (Fig. 7) holds the rod 83 normally downward. In this downward position, the arm 80 rests upon the stop 81, as shown in Fig. 4, and the cylinder 76 is in the position shown in Fig. 3. Thus the position of the cylinder may be determined by adjustment of the stop 81 and this is independent of the downward position of the arm 30.

In the cylinder 60 (Fig. 3) is a piston 90 having a hollow piston rod 91. Slidably mounted in the piston and in the hollow or tubular piston rod is a pilot rod 92 with a relatively small piston head 93 and with a pointed end 94.

In the operation of the machine the hopper 1 operates constantly and supplies a quantity of fittings to the tube 4 with the fittings all positioned in one direction which may be with their nut-shaped heads downwardly as above mentioned. The hopper keeps the tube 4 full of fittings and if the tube overflows, the fittings fall back into the hopper. The normal at rest position of the parts is as shown in Fig. 3, with a fitting resting in the aperture 18 and with two fittings in the holder 76. An operator now places a piece of tubing in the block 35 and in doing so, the trigger 45 is actuated. This actuates the switch 42 and electrical current is transmitted to the timer and thence to the solenoid 53 and the valve 52 is actuated for the passage of air therethrough. The air under pressure flows to the cylinders 32 and 39. The pistons in the cylinders are shifted and the shuttle is moved from the Fig. 3 position to the Fig. 6 position and the tube is clamped by the element 36. It will be understood that there were two fittings in the cylindrical holder 76 at the time the tube was placed in position. The action of shifting the shuttle and of clamping the tube occurs quickly, and in the shift of the shuttle the arm 30 pulls the rod 83 upwardly and rocks the holder from the position shown in Fig. 3 to the position shown in Fig. 6. The position of the holder 76 when shifted as shown in Fig. 6, may be accurately determined by the adjustment of the stop 82 and nut 84.

At the same time, air is transmitted to the cylinder 60 through the conduit 54. There is a slightly delayed action in the shift of the piston 90 and the piston 93 because of the relatively low air pressure maintained on the left side of the cylinder 90, as Fig. 3 is viewed. This delay may be regulated by the valve 62. Accordingly, the holder 76 rocks from the Fig. 3 position to the Fig. 6 position before the piston 90 begins its movement or advances any appreciable extent. When the piston moves forwardly, the pilot rod 92 moves therewith and the projecting end of the pilot rod passes through the fittings. The hollow piston rod moves through the aperture 77 of the holder 76, which aperture is now in alignment with the piston rod and the fittings are therefore pushed to the left as Figs. 3 and 6 are viewed. The pointed end of the pilot rod engages in the open end of the tubing and its movement is checked. This is permitted because the pilot rod is slidably mounted in the piston. However, the air pressure applied to the piston 90 causes the same to continue its movement and the fittings are therefore caused to slide along the pilot rod 92 and thence onto the tubing as shown in Fig. 6.

The fitting which was in the aperture 18 drops head first through the tube 22, slides upwardly in the bight portion 24 and then slides downwardly through tube 25. In order to accelerate this action, air under pressure as controlled by the valve 58, may be introduced into the tube 22 to thus aid the action of gravity. This fitting may come to rest on the holder 76 as shown in Fig. 6, while the holder is still in the Fig. 6 position; then again the holder may have returned to the Fig. 3 position before the fitting arrives to the location shown in Fig. 6. Another fitting falls into the aperture 19 of the shuttle.

The timer is so set as to maintain the electrical current on the solenoid 53 for a suitable period of time and then the timer breaks the circuit thus closing valve 52 with the valve serving to vent the line 64 and all lines connected thereto. The spring 31 returns the shuttle to the Fig. 3 position and the spring 88 returns the holder 76 to the Fig. 3 position while the spring pressed plunger 41 actuates the clamp 36 to release the tube. At this time, the fitting which reposes in the aperture 19 of the shuttle drops through the tube 23 and it, preceded by the fitting which has just dropped through the tube 22, slides into the holder in the position shown in Fig. 3. The venting of the line 54 results in the movement of the piston 90 and the pilot rod 92 back to the position shown in Fig. 3, due to the constant air pressure supplied to the cylinder through the line 64.

The parts have now gone through one cycle of operation, the tube with the fittings applied thereto are removed and another tubing inserted. The operation of the machine is rapid and is capable of functioning as rapidly as an operator can supply lengths of tubing thereto.

It has not been deemed necessary to show the details of the electrical timer 72, the solenoid 53 and the valve 52 as such elements are known to those versed in the art and the pressure of the air supplied to the valve 52 and to the reservoir 63 may be ascertained by the gauges shown. It might be further said that when air pressure is applied to the cylinder 60 through line 54 that the air under relatively low pressure on the opposite side of the piston is displaced and/or compressed back into the tank 63.

I claim:

In an apparatus for applying two hollow fittings, each having a head at one end and a screw thread at the other end, onto a length of tubing, comprising a conduit adapted to hold fittings in a column with the fittings all having the same position relative to each other, passage means of conduit form and of U-shape having a closed conduit bight portion positioned lowermost and having two conduit arm portions extending upwardly therefrom, the ends of the two arm portions being spaced from each other, the outlet end of said conduit being positioned adjacent to and above the said ends of the conduit arms of the passage means, a shuttle device positioned between the outlet end of the conduit and the upper ends of the two conduit arms and having apertures therein for receiving fittings from the conduit, means for shifting the shuttle device back and forth to thereby discharge alternate fittings respectively into the two conduit arms of the U-shaped passage, an outlet passage connecting into the conduit bight portion tangentially and disposed at an angle to the horizontal, whereby one fitting discharged into one conduit arm gravitates therethrough and directly into the tangential outlet passage, and the next fitting which is discharged into the other conduit arm gravitates therethrough and traverses the intersection between the outlet passage and the conduit bight portion and then reverses its direction of movement and gravitates through the outlet passage in reversed position, and mechanism at the end of the outlet passage for receiving two reversely positioned fittings.

ARTHUR W. PAYNE.

References Cited in the file of this patent

UNITED STATES PATENTS

| Number | Name | Date |
|---|---|---|
| 323,180 | Mason | July 28, 1885 |
| 612,865 | Muslar | Oct. 25, 1898 |
| 1,212,227 | Whittaker | Jan. 16, 1917 |
| 1,765,825 | Cork | June 24, 1930 |
| 2,105,377 | Seeley | Jan. 11, 1938 |
| 2,177,231 | Tinnerman | Oct. 24, 1939 |
| 2,278,544 | Gaskill et al. | Apr. 7, 1942 |
| 2,281,190 | Bertalan | Apr. 28, 1942 |
| 2,322,538 | Muther | June 22, 1943 |
| 2,324,925 | Hallowell | July 20, 1943 |
| 2,353,774 | Wagner | July 18, 1944 |
| 2,421,916 | Underwood | June 10, 1947 |
| 2,510,137 | Post | June 6, 1950 |

FOREIGN PATENTS

| Number | Country | Date |
|---|---|---|
| 378,774 | Great Britain | Aug. 18, 1932 |
| 586,042 | Germany | Oct. 17, 1933 |